Patented Sept. 30, 1952

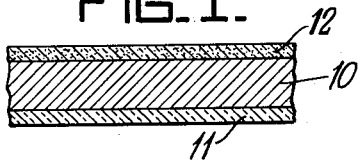
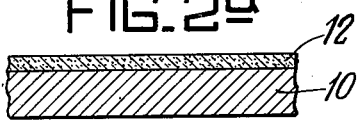
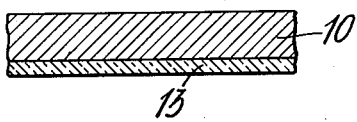
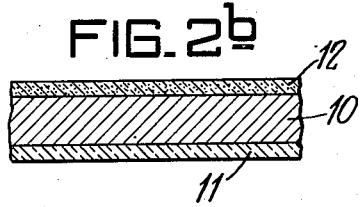
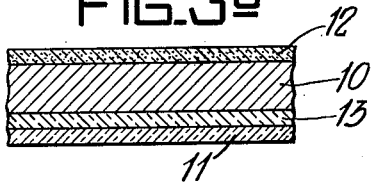
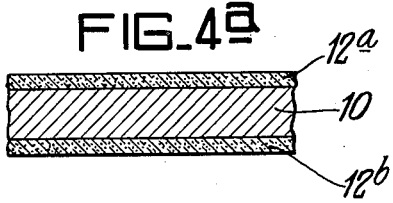
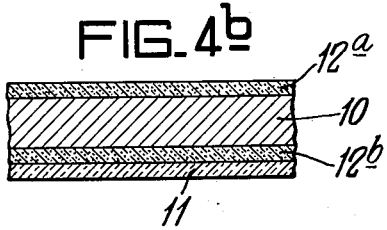
Inventor:
HENRY M. DAVIS,
by: Donald G. Dalton
his Attorney.

2,612,457

UNITED STATES PATENT OFFICE 2,612,457

METHOD OF ENAMELING METALWARE

Henry M. Davis, State College, Pa., assignor to United States Steel Company, a corporation of New Jersey Application September 1, 1950, Serial No. 182,731

4 Claims. (Cl. 117—68)

This invention relates to the vitreous enameling of metal ware and, in particular, to a method which eliminates delayed defects resulting from the evolution of gases during or after the firing of the ware.

It is well known in the enameling industry that certain defects occurring in enameled sheet-steel ware during or after firing are caused by gases, largely $H_2$, occluded in the base metal. The delayed defects are known by such names as "fish scales," "shiners," "bloats" and "pop-offs," (see "Classification and Definition of Delayed Defects in Porcelain Enamels," by J. H. Keeler, P. K. Chu, and H. M. Davis, presented at 52nd Annual Convention of American Ceramic Society at New York, New York, April 25, 1950; to be published in Journal of the American Ceramic Society). They are of such nature as to render the ware unsalable as prime product, but no satisfactory method for preventing them has been known heretofore. I have invented a procedure for enameling sheet-steel ware whereby gases in the base metal are permitted to escape harmlessly, thus avoiding the appearance of any visible defects in the finished article which might otherwise be caused by such gases.

In a preferred practice, my method consists of applying a conventional enamel coating to one surface of the steel ware and applying to the other surface a layer of enamel slip which is not fired to form a completely fused glass but is only partially fused to make it adhere to the base metal while leaving it sufficiently porous to permit the escape of occluded gases therethrough without disturbing the fused layer on the opposite surface. I accomplish this result by modifying the slip used for the incompletely fused layer so as to increase its refractoriness. The addition of refractory compounds such as alumina, magnesia, mullite, or silica to the slip serves the purpose and permits both layers to be fired simultaneously. The porous coat may be fired before or after the fused coat, even where only a single fused coat is applied, but this is not necessary and is ordinarily undesirable because of greater cost. Where it is desirable to apply ground and finish coats of enamel fused successively to one surface of the ware, I apply the slip for forming the porous, incompletely fused coat to the other side after firing the ground coat, so it will be burned on in the second firing which fuses the finish coat applied over the ground coat. As a further alternative, the incompletely fused coat may be applied to both sides of the ware and may serve as a ground coat for the fused finish coat subsequently applied to one side only.

A complete understanding of the invention may be obtained from the following detailed description and explanation which refer to the accompanying drawings illustrating the present preferred practice and modification thereof. In the drawings;

Figure 1 is a section through a portion of a metal sheet enameled according to my invention;

Figures 2a and 2b are similar views showing successive stages in a modified practice; and Figures 3a and 3b, 4a and 4b similarly show further modifications.

As already indicated, my invention is particularly concerned with the application of a coat of slip used for ordinary enamel to one side of a metal article and the application to the other side of a coat of slip which is fired not to complete fusion and coalescence but only to a partially fused, adherent condition. Before slip of either kind is applied, the base metal is cleaned and given a nickel dip in the known manner. The slips for both the fused and the porous enamel coats consist largely of a frit having the following composition (percentage by weight):

| | |
|---|---|
| $SiO_2$ | 48.5–53.0 |
| CaO | 0.2– 1.5 |
| $Al_2O_3$ | 5.0– 8.1 |
| $Na_2O + K_2O$ | 17.8–21.3 |
| $B_2O_3$ | 15.2–19.8 |
| $CaF_2$ | 3.0– 5.5 |
| NiO | 0.5– 0.8 |
| CoO | 0.6– 1.2 |
| $MnO_2$ | 1.0– 2.0 |

This, of course, is a boro-silicate frit. It is smelted at about 2200° F. When ground to the required fineness (200 mesh), it is mixed with other slip-forming materials in a smilar state of sub-division, as follows:

| | Parts by weight |
|---|---|
| Base frit of above type | 100 |
| Enamelling clay | 7–10 |
| Crystalline borax ($Na_2B_4O_7 \cdot 10H_2O$) | 0.5 |
| Water | 50 |

Slip is prepared from the above materials in the known manner and applied to one side of the ware. When dried and fired at a temperature between 1440° and 1550° F., this slip fuses and coalesces to form a vitreous layer closely bonded to the base metal.

For forming the imperfectly fused porous layer on the other side of the metal, I modify the slip described above by adding to it as a mill addition, the specified amount of any one of the following substances ground to pass through a 200-mesh screen:

| | Parts by weight |
|---|---|
| $Al_2O_3$ | 25–30 |
| MgO | 30–40 |
| Mullite ($3Al_2O_3 \cdot 2SiO_2$) | 30–40 |
| Quartz ($SiO_2$) | 40–50 |

The addition of such refractory material raises the fusion temperature range of the slip so that when the slip is burned at a conventional temperature between 1440° and 1550° F., the resulting enamel is incompletely fused and porous. The amount of the added refractory compound should be sufficient to provide a safe margin say 30° or preferably 40° F. between the fusion temperature of the unmodified slip and that having added refractory material so that fusion of the former may be effected without vitrifying the latter. Thus both slips may be applied successively and dried, then fired simultaneously.

The following specific example illustrates in greater detail how the invention may be practiced. Frit having the analysis below was first smelted and ground:

| | Percent by weight |
|---|---|
| $SiO_2$ | 49 |
| $Al_2O_3$ | 7.7 |
| $B_2O_3$ | 17 |
| CaO | 2.9 |
| $K_2O$ | 4.5 |
| $Na_2O$ | 15 |
| $F_2$ | .4 |
| NiO | .7 |
| CoO | .6 |
| $MnO_2$ | 1.4 |

Balance minor ingredients.

Slip was made from the frit by adding 7% clay and 50% water by weight of the frit. This slip was prepared and applied in the known manner to the surface to be coated with vitreous enamel. A modified slip containing, in addition to the above, 25% alumina by weight of the frit, was applied to the other surface of the base metal. The coated metal was then fired at 1500° F. for four minutes. This fused the original slip but left the modified slip porous and permitted the escape of occluded hydrogen without causing surface defects in the fused coating.

Figure 1 illustrates the result of the described procedure, after firing. The base metal 10 has a coat 11 of vitreous enamel on one side and a coat 12 of partially fused, porous enamel on the other. The coat 12 remains pervious to gases evolved from the metal base after firing and permits the escape thereof without the formation of delayed defects in coat 11. The latter may be a ground coat or a so-called direct-white coat, i. e., a white or light coat applied directly without first applying a dark ground coat, which is the more usual procedure. The exact composition of slip for coat 11 is selected on the basis of its maturing temperature. It is essential that the maturing temperature of the porous enamel be safely higher as aforesaid than the maturing temperature of any ground-coat or cover-coat enamel fired simultaneously with it. If a porous coat and a direct-white coat were to be used on opposite surfaces of steel, they could be matched so that they would be properly fired (in their different ways) at the same temperature; or, the porous coat could require the higher temperature, in which case two firings would be required.

The permeability of the enamel to hydrogen, and not merely its total porosity, is the significant property. If a sheet having hydrogen occluded therein is enamelled on both surfaces, one of the coatings being of the porous type, and the enamelled panel can be air-cooled from enameling temperature without the immediate or subsequent development of gas-produced defects, the permeability of the porous coat is adequate.

A rapid and severe test for suitable permeability consists of removing the enamel from the surface opposite the porous coat (by sand-blasting) and applying to the bare steel a warm 6% solution of sulfuric acid. Within 10 to 15 minutes, this test will produce defects of the delayed type in any of the ordinary commercial enamels now in use. If the porous coat has been fired to the correct permeability, it will be free of defects of the delayed type after this test. Actually, the permeability necessary to protect a given steel-enamel system will vary importantly with the kind of steel, its thermal, chemical and mechanical history, and with the composition of the enamel itself insofar as that affects adherence. Thus, if an enameled panel endures the acid test described above, the permeability of the porous coat may be much greater than absolutely necessary for the particular steel-enamel pair, but it will surely be great enough. The alternative is to let the enameled piece stand at atmospheric temperature for several weeks to see whether it develops delayed defects. When, by either test, adequate permeability of the porous enamel has been proved, continued production by the procedure demonstrated to be satisfactory is justified. The acid test could be used as a regular control test.

Finally, it should be stated that, as will be apparent to those familiar with the art, the porosity and permeability of a fired enamel of the type described are the resultant of the combined influences of the composition and homogeneity of the enamel, the thickness of the coat, the thickness of the steel, the firing temperature, and the firing time. For a coating with the properties sought, the desirable thickness of coat and the firing time both fall within the limits of conventional practice. For a given porosity and permeability, a thicker coat must receive more burning, that is, at higher temperature or for a longer time, or both, than is required by a thinner coat.

The porous coat 12 exhibits sufficient adherence to the base metal to serve satisfactorily for many applications such as those in which one side of a panel, for example, is concealed and protected throughout its life (refrigerators, ranges and wall panels). The adherence is enhanced by a preliminary nickel dip and may be further increased by including oxides of nickel, cobalt or arsenic in the frit.

Figures 2a and 2b represent the alternative double-firing procedure mentioned above. According to this modification, the porous coat 12 is first applied to the base metal 10, dried and fired, then the vitrifying coat 11 is similarly applied, dried and fired. Occluded gases escape readily from the exposed surface of the base metal during and after the first firing. After the second firing they escape through the porous coat 12. The final firing temperature must be kept below the fusion point of the slip forming this porous coat.

Figures 3a and 3b illustrate another modification in which a ground coat 13 is first applied to the base metal 10 and fired to fusion. The finish coat 11 is then applied over the ground coat and the porous coat 12 to the reverse side of the base metal. A second firing fuses coat 11 but not coat 12, leaving it porous for the escape of any gases evolved during the second firing and afterwards.

According to a further modification, a porous coat of enamel is first formed on both sides of a metal base 10 as shown at 12a and 12b in Fig. 4a. Next a finish coat 11 is applied over coat 12b and fired to fusion. In this modification, coat 12b serves as a ground coat for the finish coat 11.

I claim:

1. In a method of enameling sheet-steel the steps including applying to one side of the metal a slip composed largely of boro-silicate frit with a small amount of clay, applying to the other side a similar slip containing in addition from 25 to 50% by weight of frit of a metal oxide which increases the fusion temperature of the slip, drying the applied slips, and firing the coated metal at a temperature between the fusion point of the first-mentioned slip and that of the second-mentioned slip, thereby vitrifying the slip applied to said one side yet leaving the slip applied to the other side incompletely fused and permeable by gases occluded in the metal.

2. The method defined by claim 1 characterized by said oxide being selected from the group consisting of alumina, magnesia, mullite and quartz.

3. In a method of enameling sheet-steel the steps including applying to one side of the metal a slip composed largely of boro-silicate frit with a small amount of clay, applying to the other side a similar slip modified to increase its fusion temperature substantially, drying the applied slip and firing the coated metal at a temperature between the fusion point of the first-mentioned slip and that of the second-mentioned slip, thereby vitrifying the slip applied to said one side yet leaving the slip applied to the other side incompletely fused and permeable by gases occluded in the metal.

4. In a method of enameling a sheet-steel article, the steps including applying to one side thereof a slip which vitrifies at a temperature between 1440° and 1550° F., applying to the other side a modified slip which fuses at a temperature substantially higher than that at which the first-mentioned slip vitrifies, and firing the article thus coated at the proper temperature of vitrification of the first-mentioned slip, thereby vitrifying the slip applied to said one side yet leaving the slip applied to the other side incompletely fused and permeable by gases occluded in the metal.

HENRY M. DAVIS.

REFERENCES CITED

The following references are of record in the file of this patent:

UNITED STATES PATENTS

| Number | Name | Date |
| --- | --- | --- |
| 2,053,244 | Turk | Sept. 1, 1936 |
| 2,127,388 | Canfield | Aug. 16, 1938 |
| 2,135,544 | Turk | Nov. 8, 1938 |
| 2,294,914 | Kerr | Sept. 8, 1942 |
| 2,321,763 | McIntyre | June 15, 1943 |